United States Patent [19]

Paech

[11] Patent Number: 5,105,687
[45] Date of Patent: Apr. 21, 1992

[54] BUILT-IN RACK APPARATUS

[75] Inventor: Ivor N. Paech, Christies Beach, Australia

[73] Assignee: Longyear Company, Salt Lake City, Minn.

[21] Appl. No.: 543,691

[22] Filed: Jun. 26, 1990

[51] Int. Cl.⁵ .......................... F16H 37/00; E21B 3/00
[52] U.S. Cl. ................................... 74/665 C; 74/130; 74/661; 81/57.22; 173/12; 173/163
[58] Field of Search ............... 173/12, 2, 164, 163; 74/665 C, 130, 661; 81/57.14, 57.15, 57.3, 57.33, 57.22

[56] References Cited

U.S. PATENT DOCUMENTS

| | | | |
|---|---|---|---|
| 2,019,814 | 11/1935 | Holmes et al. | 279/4 |
| 3,972,242 | 8/1976 | Hunt | 81/57.39 X |
| 4,266,444 | 5/1981 | Anderson et al. | 81/57.22 X |

Primary Examiner—Frank T. Yost
Assistant Examiner—C. Dexter
Attorney, Agent, or Firm—Clayton R. Johnson

[57] ABSTRACT

For breaking out a drill rod joint, a hydraulic chuck is mounted by a housing for clampingly engaging a drill rod and for rotation to break a rod joint, the chuck being rotated by a first gear that is bolted to a drive tube which mounts the chuck. A hydraulic motor drives a second gear within the housing for rotating the first gear. A rack is mounted for tangential movement by a rack mount which is movable radially inwardly to move the rack teeth for engaging the first gear teeth while a first spring mechanism constantly resiliently urges the rack mount to a retracted position so that the rack teeth are not engagable with the gear teeth even though the rack is tangentially moved by a first hydraulic ram that is operable for moving the rack to a tangential advance position. A second spring mechanism urges the rack radially outwardly, a second ram being operated to radially move the rack mount and thereby the rack to have the rack teeth engagable with the gear teeth. Hydraulic controls automatically operate the second ram to move the rack inwardly and thereafter the first ram tangentially to apply a rotary force to the gear teeth in the event the motor is not able to initially start the rotation of the second gear to start the breaking out of a rod joint.

18 Claims, 4 Drawing Sheets

BUILT-IN RACK APPARATUS

BACKGROUND OF THE INVENTION

The present invention is related to apparatus for making up and breaking out rod joints of, for example, a drill string.

It is highly desirable to be able to break the threaded joints in a drill rod string by reversing the direction of a hydraulic motor. Generally the torque required to break the threaded joint exceeds the torque available from the hydraulic motor, even at the maximum hydraulic pressures. This is due to the joints tightening up during drilling which in turn is caused by torque peaks experienced during normal rotation of the drill rod string in a direction for increasing the depth of the bore hole.

In the prior art, for example see U.S. Pat. No. 4,266,444 to Anderson et al, it is old to provide rotary drive apparatus that includes a hydraulic motor for driving a first ring gear that in turn drives a second ring gear that is connectable to the member to be rotated and a third ring gear that is rotated by rack mechanism and is connectable through ratchet mechanism to drive the second gear when high torque is required to drive the second gear. The rack mechanism includes a piston cylinder combination for reciprocating the rack mechanism.

In U.S. Pat. No. 3,972,242 to Hunt there is disclosed a hydraulic wrench having a lock down cam that is fixedly connected to the piston rod of a cylinder to be reciprocated therewith and a rack that is connected to the piston rod through a lost-motion type connection such that when the piston rod is extended the cam first slides along the rack to force the rack teeth into intermeshing relationship with the teeth of the ratchet and thereafter move the rack to rotate the ratchet for tightening and loosening bolts and nuts. Thence, upon retracting the piston rod, first the cam is retracted sufficiently such that the rack can move out of intermeshing relationship with the ratchet and thereafter the rack is retracted with continued retraction of the cam.

In U.S. Pat. No. 2,019,814 to Holmes et al there is disclosed a chuck having a gear toothed ring intermeshing with a rack that is reciprocated by a piston cylinder combination.

In order to provide a simplified unit for making up rod joints and breaking out rod joints, including an initial slower speed higher torque force if necessary for breaking out the rod joint, this invention has been made.

SUMMARY OF THE INVENTION

The drilling apparatus includes a drill rig or other mechanism having a frame for mounting a rod rotating mechanism having a clutch assembly that is operable for clampingly engaging a drill rod and being rotated by rack gear mechanism. The rack gear mechanism includes a first ring gear that is drivingly connected through a driven sleeve to a chuck assembly for rotating the assembly in either direction, and a second ring gear in intermeshing relationship with the first gear and driven by a hydraulic motor. A rack is mounted by a rack mount for movement in one longitudinal direction by a hydraulic ram and an opposite direction by a spring mechanism when the rack mount is in a drive position as the rack ram piston is extended. The rack mount is movable by a second ram to the drive position from a remote position radially more remote from the first gear than when the rack is in the drive position whereby even if the rack were longitudinally moved, the rack teeth would not engage the first gear teeth. The rack mount is constantly resiliently urged to its remote position. Also there is provided a control mechanism for automatically actuating the rams in the event a higher torque is required to initially start the rotation of the first gear and therethrough the driven sleeve than that provided by the motor.

One of the objects of this invention is to provide new and novel means for breaking out a rod joint. In furtherance of the above object, it is a further object of the invention to provide new and novel means for mounting a rack and moving a rack into and out of driving relationship to a mechanism for rotating a drill rod in an unthreading angular direction. Another object of this invention is to provide new and novel means of a relatively simple construction for drivingly rotating a chuck assembly or other mechanism in a given angular direction at a maximum first torque force, and if required, initially provide a lower speed drive force at a substantially higher torque than the first torque to start the initial rotation of the chuck assembly.

DESCRIPTION OF THE PREFERRED EMBODIMENTS

Figure 2:
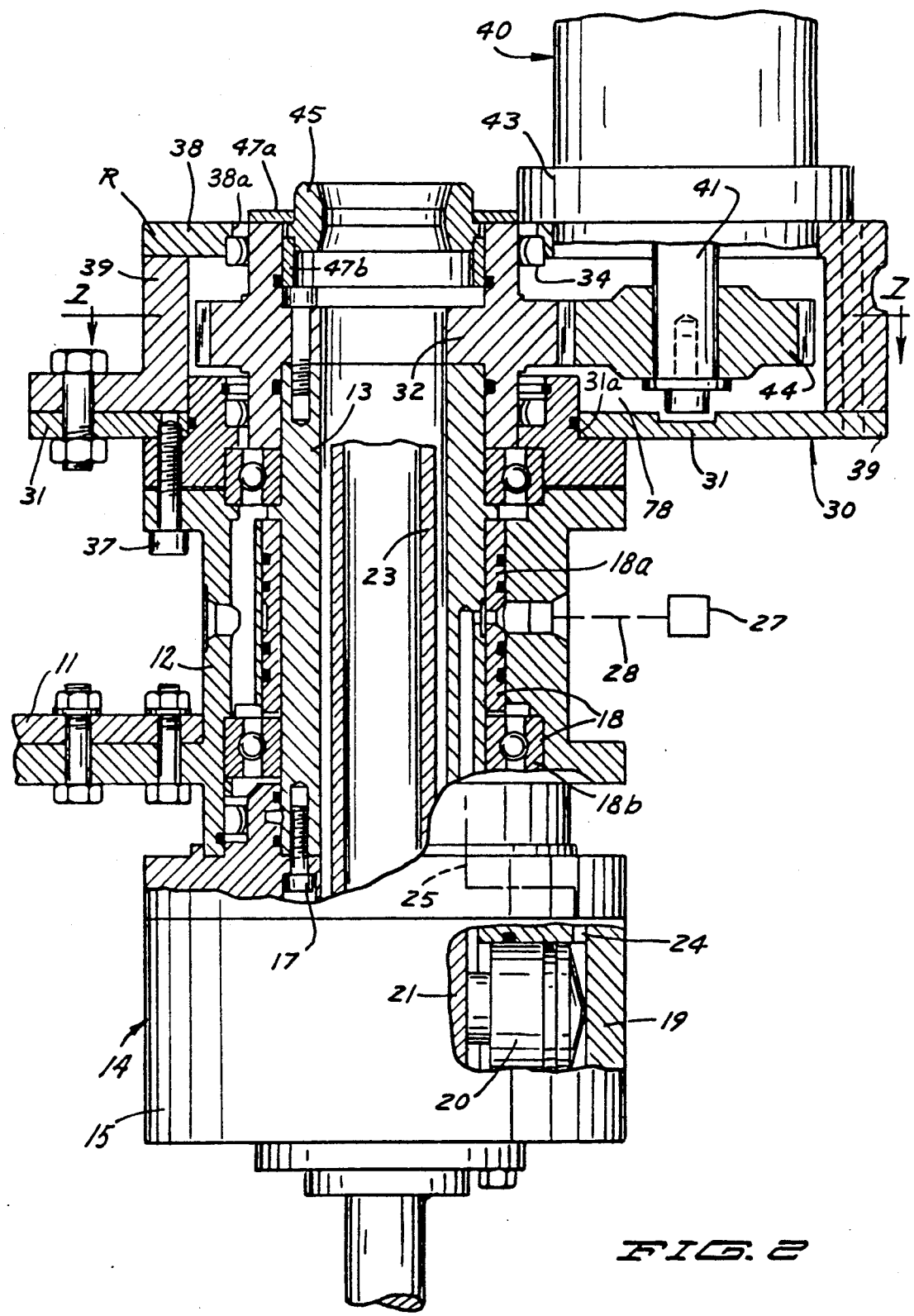
FIG. 2 is in part a side view and in part a cross sectional view that is generally taken along the line and in the direction of the arrows 2—2 of FIG. 1.

Referring in particular to FIG. 2, the built-in breakout rack apparatus of this invention is mounted on, for example, a drill rig drill head frame 11 which in turn mounts a driven sleeve housing 12. An axially elongated driven sleeve 13 is rotatably mounted in the driven sleeve housing 12 by conventional rotary mounting mechanism 18 that includes fluid seals 18a and bearings 18b. The housing 15 of a conventional chuck assembly, generally designated 14, is dependingly bolted by bolts 17 to the lower end of the driven sleeve 13 to rotate therewith. The chuck housing 15 mounts a plurality of jaw cylinders 19 having pistons 20 therein for moving the jaws 21 to clampingly engage a drill rod 23, the jaws being urged to a retracted position by springs means (not shown). A source of fluid under pressure (not shown) is fluidly connected through conventional control mechanism 27 and line 28 to flow through passages 25 in the rotary mechanism, driven sleeve and chuck housing to port 24 and into the cylinder 19 for moving the pistons 20 to move the jaws 21 to their rod clamping positions.

The bottom wall 31 of rack gear mechanism, generally designated 30, is bolted at 37 to the upper end portion of the driven sleeve housing to extend thereabove. The rack gear mechanism includes a housing R having the wall 31, peripheral wall sections 39, 79 and a cover 38 removably bolted to the peripheral wall 39, 79 to enclose a housing interior 78, other than for the opening 31a that opens to the driven sleeve, and an opening 38a through the cover axially opposite the driven sleeve opening 31a and a hydraulic motor opening in the cover offset from the cover opening 38a and axially offset from the driven housing. A ring gear 32, which is located within the rack mechanism housing R and extends within opening 38a is bolted to the upper end of the driven sleeve for drivingly rotating the driven sleeve and is extended to the cover opening 38a there being provided fluid seals 34 between the ring gear and the rack mechanism and driven sleeve housing. An annular drill rod guide 45 extends into the upper end portion of the ring gear 32 and is retained in place by a retainer ring 47a and an annular spacer 47b. A hydraulic motor, generally designated 40, has a housing 43 that is removably secured to the cover 38 to extend thereabove. The motor shaft 41 of the hydraulic motor extends within the rack mechanism housing to drivingly mount an annular ring gear 44 with the teeth of gear 44 in intermeshing relationship with the teeth of the gear 32 to drive gear 32. The rotary axes of the gears 32, 44, the driven sleeve, and the chuck 14 are coextensive and parallel to the motor shaft axis.

Figure 1:
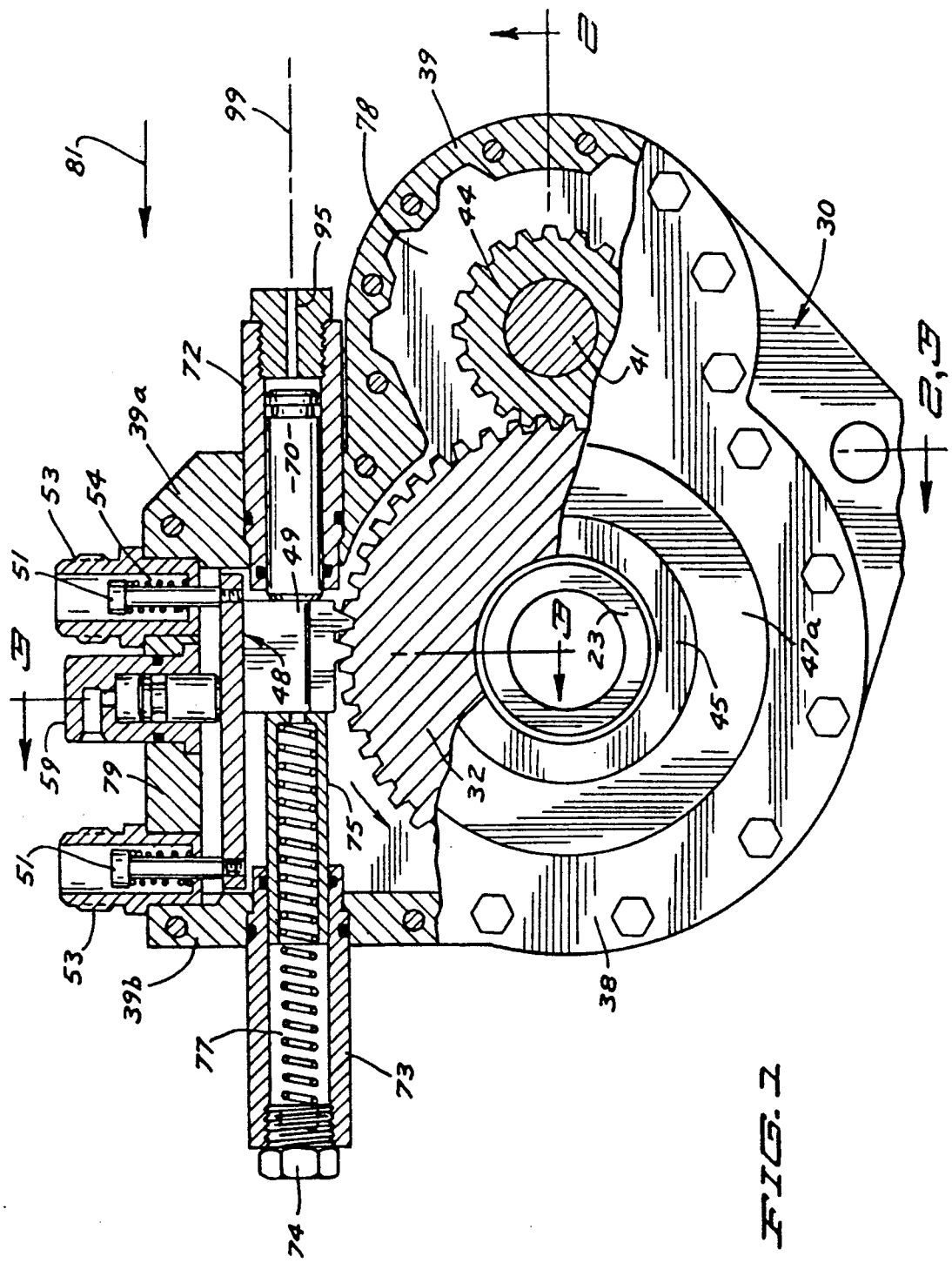
FIG. 1 is in part a plan view and in part a cross sectional view that is generally taken along the line and in the direction of the arrows 1—1 of FIG. 2 of the built-in rack apparatus of this invention, said view showing the rack mount in its ring gear drive position.
Figure 3:
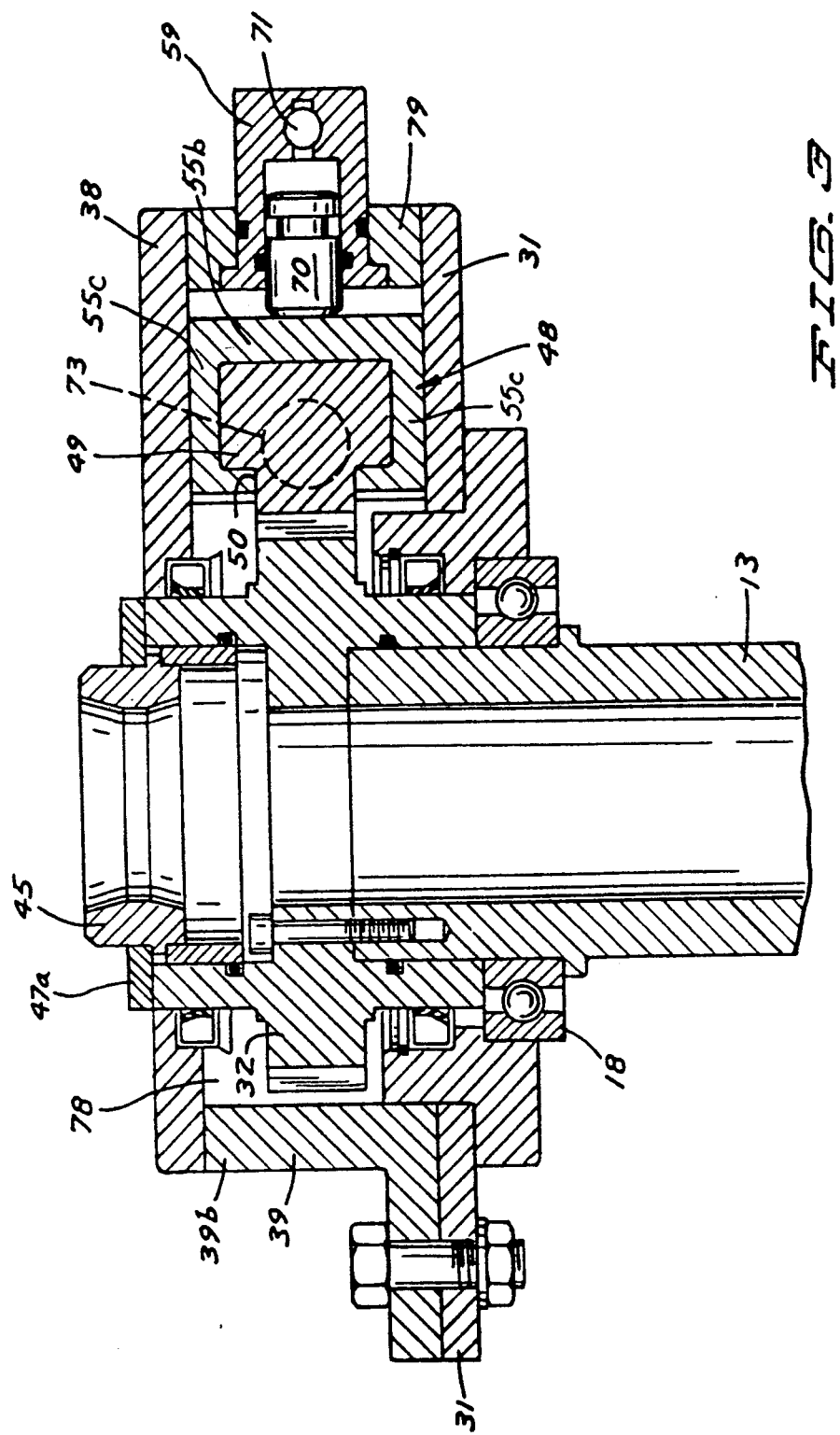
FIG. 3 is a cross sectional view generally taken along the line and in the direction of the arrows 3—3 of FIG. 1.
Figure 4:
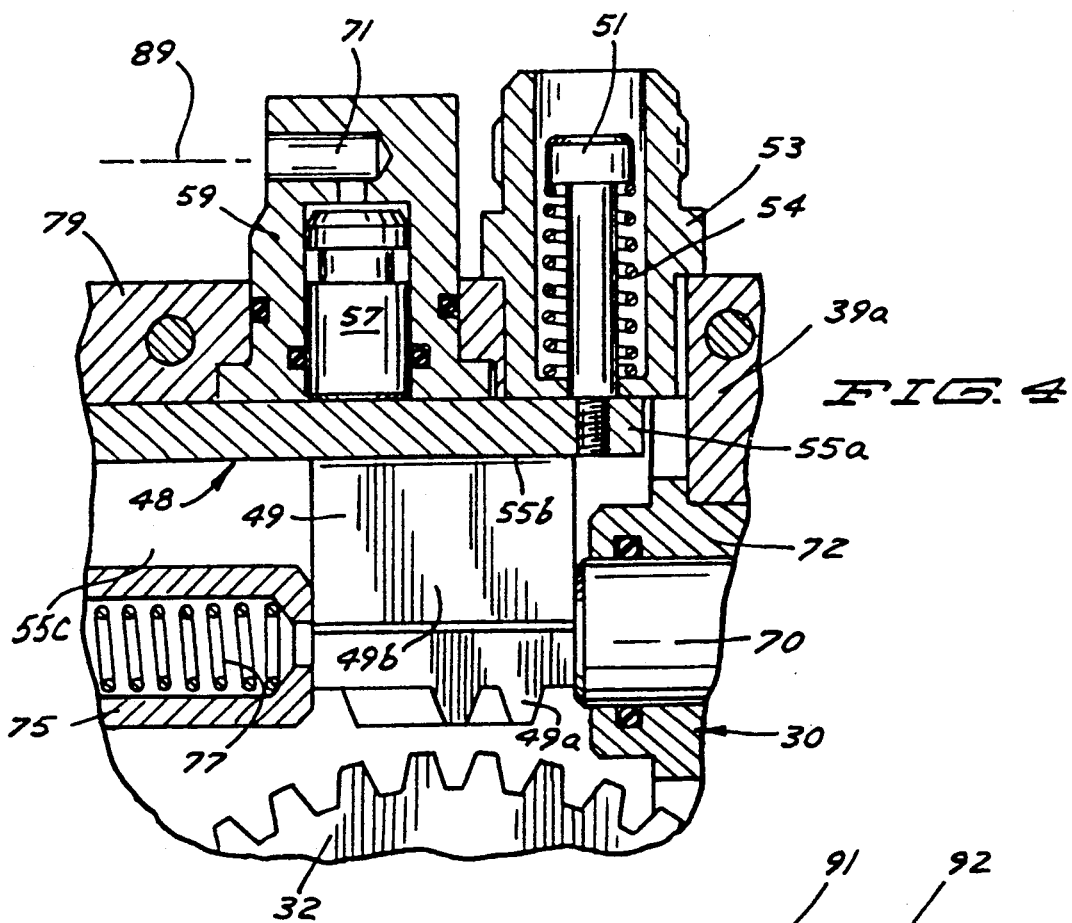
FIG. 4 is an enlarged fragmentary cross sectional view of a portion of the structure shown in FIG. 1 except that the rack mount is shown in its retracted position and the rack in its datum position.

Referring in particular to FIGS. 1, 3 and 4, the rings 32 and 34 and rack mechanism includes a longitudinally elongated, generally C-shape in transverse cross section rack mount, generally designated 48 such as shown in FIG. 3. The central axis of elongation of the rack mount is parallel to a plane tangential to the gear 32, the peripheral wall portions 39a, 39b of the peripheral wall, cover 38 and bottom wall 31 serving to mount the rack mount for translatory movement in directions perpendicular to the above mentioned tangential plane. The peripheral wall section 79 extends linearly between peripheral wall portions 39a, 39b, parallel to the above mentioned plane and serves to limit the translatory movement of the rack mount in a transverse direction away from the gear 32 upon the rack mount abutting against section 79.

The rack mount serves as a guide for mounting the main body 49b of the rack mechanism of the rack 49 for longitudinal movement relative thereto with the rack teeth 49a extending through the rack mount slot 50 in a direction toward the teeth of the gear 32 and for transverse movement therewith. The rack may be of a relatively short longitudinal length and have only a few teeth, for example two. When the rack mount outer longitudinal wall is in abutting parallel relationship to the peripheral wall section 70, the teeth of the rack are sufficiently transversely (radially) spaced from the teeth of the gear 32 such that even if the rack were longitudinally moved its maximum longitudinal distance the rack teeth would not engage the teeth of the gear 32.

In order to maintain the rack mount in substantial parallel relationship to the wall section 79, a pair of longitudinally spaced, transversely extending annular guide inserts 51 are mounted by the section 79 to open to the housing interior 78 to have the guide bolts 53 transversely movably extended therein and into the housing interior. Guide bolts 53 have their head end portions located in the maximum diameter bore portions of the inserts while the intermediate portions of the bolts are slideably extended through the minimum diameter bore portions. Each of the inner end portions of the guide bolts are threaded into the adjacent one of the longitudinal end tabs 55a of the rack wall 55b that extend longitudinally outwardly of the rack mount main body 55b, 55c, the rack wall 55b being transversely opposite the slot 50 and extending vertically between the rack mount main body walls 55c. Springs 54 abut against the head ends of the guide bolts and the shoulders formed by the intersection of the maximum and minimum bore portions of the inserts 53 to constantly resiliently urge the rack body to move to its retracted position in abutting relationship to wall section 79.

A rack mount cylinder 59 is mounted by the wall section 79 and has a piston 57 therein in abuttable relationship with the rack main body longitudinally intermediate the guide bolts for moving the rack mount inwardly toward the gear 32 to a gear drive position for rotating the gear when the rack is moved from its longitudinally retracted, transversely inward position of FIG. 1. Pressurized hydraulic fluid is applied through cylinder port 71 of the cylinder 59 for extending the piston 57 for moving the rack mount from its radial outward position to its radial inward position, the piston being retracted by the springs 54 acting against the guide bolts when no fluid under pressure or fluid under insufficient pressure is applied at port 71.

For moving the rack in a longitudinal direction to rotate the gear 32 when the rack mount is in the FIG. 1 position, a rack cylinder 72 is mounted by the peripheral wall portion 39a to open into the housing interior 78, the piston 70 in the cylinder being operable under fluid pressure to move the rack in the longitudinal (tangential) direction of arrow 81 to rotate the gear 32 when the rack mount is in the position shown in FIG. 1. A plunger 75 abuts against the end of the rack that is longitudinally opposite the piston 70 and is resiliently retained in abutting relationship to the rack by the spring 77 that at least in part is located within the plunger tube 73. The opposite end of the spring abuts against the spring seat 74 which is mounted by the end portion of the plunger tube 73 opposite the rack. The plunger tube is mounted by the peripheral wall portion 39b to open into the housing interior 78, the central axes of the longitudinally elongated cylinder 72, the plunger and the plunger tube being coextensive and parallel to the wall section 79. The maximum diameters of the plunger and piston 72 are smaller than the height of the rack mount slot 50 as shown in FIG. 3 so as not to interfere with the transverse (radial) movement of the rack mount. The adjacent end portions of the plunger tube and cylinder 72 having flat lands located within the housing interior to be abuttable against the adjacent rack mount tab 55a to limit the transverse inward movement of the rack mount. The main body of the rack mount extends longitudinally substantially the entire longitudinal distance between the adjacent ends of the cylinder 72 and the plunger tube.

Figure 5:
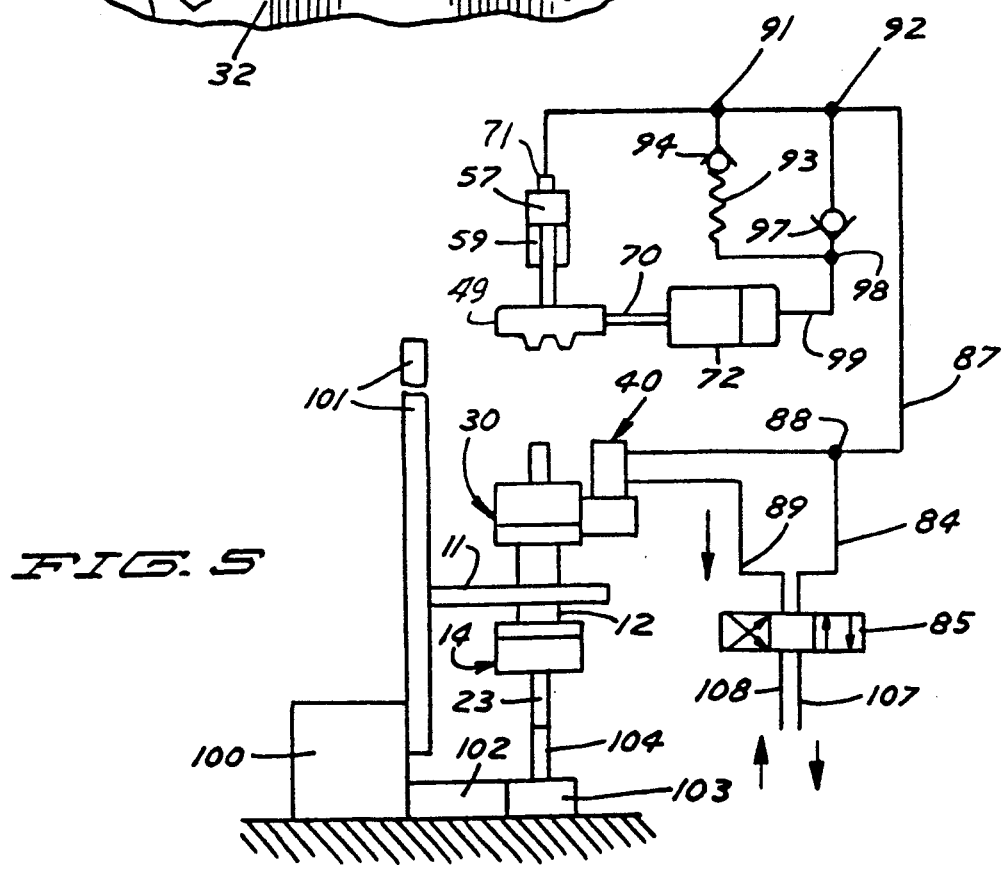
FIG. 5 is a somewhat diagrammatic showing of a drill rig having the built-in rack apparatus of this invention and part of the control apparatus for moving and controlling the movement of the rack and rack mount.

Referring to FIG. 5 wherein there is a simplified showing of some of the controls and control components, the frame 11 may be, for example, a drill head frame, mounted for movement on the mast 101 of a drill rig 100 that has a base mounting a face clamp 103. Members 100–103 are of conventional construction and therefore will not be further described. The control circuit and components, only part of which will be described, includes hydraulic conduits 84, 89 fluidly connected to hydraulic motor to drive the motor in the selected angular direction (forward and reverse). The motor may be either of a fixed or a variable displacement type. A control valve 85 is connected to the conduit 84 while a junction 88 is provided in conduit 84 intermediate the valve 84 and the motor. It is to be noted that valve 85 may be a conventional three position valve that in a neutral position shown in FIG. 5 blocks fluid flow from the pressurized conduit 108, which is connected to a source of pressurized fluid (not shown), to either one of conduits 84, 89 while permitting fluid flow from line 84 and through conduit 107 to a sump (not shown), a forward drive second position to fluidly connect conduit 89 to conduit 108 and conduit 84 to conduit 107 that is fluidly connected to the sump, and a reverse third position to fluidly connect conduit 108 to conduit 84 and conduit 107 to conduit 89. A conduit 87 fluidly connects the junction 88 to port 71 of the cylinder 59, there being provided junction 91, 92 in line 87 intermediate junction 88 and cylinder 59 (port 71, see FIG. 4). A conduit 99 fluidly connects the junction 88 to port 95 of the cylinder 72 for applying fluid pressure to move the piston 70 to move the rack in the direction 81.

A check valve 94 having a spring 93 therein is fluidly connected to conduit 87 between junctions 98, 91, the valve being oriented to block fluid flow therethrough from junction 98 to junction 91, but when the pressure at junction 91 is sufficiently great to overcome the action of spring 93, fluid flows through the check valve 94 to junction 98. A check valve 97 is fluidly connected between junctions 92, 98 (in parallel with check valve 94 between line 87 and junction 98) and is oriented to block fluid flow therethrough in a direction from junction 92 to junction 98 but permit fluid flow therethrough in the opposite direction.

In using the apparatus of this invention for making up a rod joint, with the drill string clamped by the face clamp 103 and the chuck 14 clamping drill rod 23 in a position to threadingly connect the drill rod to the drill stem, hydraulic fluid is applied through line 89 to forwardly rotate the drill rod to threadingly connect it to the drill string, conventional structure permitting the frame 11 to axially move relative to the face clamp to permit the rod joint between the drill string and the drill rod being made up. Even though there may be "back pressure" in the line 84 when the valve 85 is in its forward drive second position, the characteristics of springs 54, 77 are such that the pistons 57, 70 remain in their retracted positions when the motor shaft is being forwardly rotated.

When it is desired to breakout a drill rod 23 from the drill string 104 (unthread the drill rod connection to the drill string), with the face clamp 103 and chuck 14 clampingly holding the drill string and drill rod respectively, the valve 85 is operated to its third position (reverse drive position) for applying pressurized fluid through line 84 to rotate the motor shaft in its reverse direction and thereby rotate chuck 14 to unthread the drill rod 23 from the remainder of the drill string. In the event the torque required to breakout the drill rod 23 is so great that the motor stalls, the fluid pressure in lines 84, 87 and in cylinder 59 rises sufficiently that the resistance of springs 54 is overcome whereupon the piston 57 moves the rack mount and thereby the rack transversely (radially) inwardly to have the rack teeth engage, or upon movement of the rack in the direction of the arrow 81 engage, the teeth of gear 32. After the rack moves inwardly, the continued rise of pressure in line 87 results in the resistance of spring 93 being overcome and thereupon pressurized fluid flows through check valve 94 and line 99 to cylinder 72 for moving the piston 70 longitudinally (tangentially) in the direction of arrow 81 to tangentially move the advanced rack tooth (left tooth as seen in FIG. 1) into engagement with the tangentially adjacent gear tooth if not already in engagement therewith. The cylinder 59 is sized such that the piston 57 will exert a radial force sufficiently great to maintain the rack in its inward gear tooth engagement position after being moved to such a position, regardless of the force exerted by the piston 70 that acts to move the rack 70 in the direction of arrow 81.

As the pressure in line 87 continues to rise, the tangential force exerted by the rack reaches a value at which the resultant torque on the gear 32 is sufficient to turn the closed chuck which then "breaks" the rod joint, the rack moving in the direction of arrow 81. The pressure in lines 84, 87 may then tend to fall. However, by virtue of a relatively weak spring 77, the piston 70 continues to move the rack tangentially while at the same time the motor commences to rotate. Eventually the rack is moved tangentially in the direction of the arrow 81 out of engagement with the gear 32 and the motor 40 is free to rotate the drill rod, the movement of the rack in this direction being limited by the plunger abutting against the spring seat 74. The drop in pressure in cylinder 59 now may or may not result in the springs 54 retracting the rack mount and thereby the rack. It is noted that at this time the force exerted on the plunger and through the rack to the piston 70 is not sufficiently great to move the rack in the direction opposite arrow 81, but rather the teeth of the rack now continue to be tangentially spaced from the gear teeth in the direction of the arrow 81. The action of the motor stalling and increase in pressure in line 87 to move the rack occurs in a very short time, for example milliseconds and may be so fast that the drilling operator is not aware of the action of the rack being operated such that the motor starts the rotation of the motor shaft to breakout the rod joint. That is, the pressure rise in conduits 84, 87 is very fast due to a control valve 85 admitting pressured fluid to conduit 84.

After the drill rod has been unthreaded from the remainder of the drill string, the valve 85 is operated to its neutral position such that the pressurized fluid in lines 84, 87 is conducted to the sump, any fluid remaining in lines 84, 87 no longer being pressurized. As a result the spring 77 moves the plunger to move the rack and therethrough move the piston 70 in the direction opposite arrow 81 to return the piston 70 to its fully retracted position and thereby limit the movement of the rack in the direction opposite arrow 81. It is noted that the check valve 97 permits fluid to exit from the cylinder 72 to permit the action of the spring 77 moving the piston 70 in the direction opposite of the arrow 81 as above indicated.

In the event the action of the springs 54 acting on the rack mount had not previously retracted the rack mount, at the time valve 85 is operated to its neutral position, the action of springs 54 result in the rack mount being retracted to abut against wall section 79 and thereby the piston 57 being moved to its retracted position.

Thus with the present invention, in the event the rod joint is not too tight, the rack remains in the datum position of FIG. 4 and the motor will provide the power required to rotate the drill rod to breakout the rod joint. In the event the motor is actuated to drive its shaft in the reverse direction and the power of the motor is not sufficiently great to start the rotation of the chuck (motor stalls), the rack is automatically actuated to rotate the gear 32 a few degrees, which is sufficient to start the rotation of the chuck and drill rod to loosen the threaded connection of the drill rod to the drill stem, and then the motor automatically takes over to continue the rotation of the chuck. That is when, as the result of the movement of the rack, the torque decreases to less than the stall torque, the motor takes over automatically to spin the drill rod to decouple the drill rod from the drill string. It is noted that if the torque required decreases below the stall torque before the rack has been tangentially moved sufficiently that its teeth are out of meshing relationship with the teeth of the gear 32, the gear 32 in being rotated would continue the tangential movement of the rack in the direction of the arrow 81 until the teeth are in intermeshing relationship, depending on whether the action of the piston 70 or the gear 32 imparts the fastest moving force to the rack.

Even though the invention has been described with reference to a drill rig such as diagrammatically shown in FIG. 5, it is to be understood it may be substituted for the clamp and drive assemblies of U.S. Pat. No. 4,309,922 and used with the lower face clamp disclosed therein for certain types of rod breakout operations or mounted on other types of non-drill rig structure and/or breaking out pipe and/or rod joints of types other than drill rods. Further, even though the invention has been described as the gear on the motor shaft being in driving engagement with the gear bolted to driven sleeve, it is to be understood that a gear train may be provided between the motor shaft and the gear bolted to the driven sleeve in order to reduce the chuck speed relative to the motor.

With the present invention the same gear that is used to drive the driven sleeve (driven member) 13 that is driven by the gear train, if used, or gear mounted on the motor shaft is also rotatable by the rack with the rack teeth engaging the teeth of said same gear in the event the motor does not provide sufficient torque to break a rod joint. As a result the breakout apparatus disclosed herein is of a relatively simpler construction than known prior art devices while at the same time being able to provide higher torque than that obtained with just a hydraulic motor. Further the rack is retained in spaced relationship to the gear teeth until such time that the higher torque is required, and when required, the rack is automatically moved to drivingly engage the gear without any action by the operator once the hydraulic motor has been actuated to drive the motor shaft in its angular reverse direction.

Even though the chuck has been described as being of a type that the chuck jaws are hydraulically moved to a rod clamping position and resiliently moved to a rod release position, it is to be understood that the chuck may be of the type that the jaws are hydraulically moved to a rod release position and resiliently (spring) moved to a rod clamping position.

What is claimed is:

1. Apparatus for use in drivingly rotating a driven member, comprising, means defining an axially elongated housing having axially opposite open ends, first annular gear means rotatably mounted in the housing means for drivingly rotating the driven member and having first gear teeth, an actuatable motor mounted on the housing means and having a rotary drive motor shaft drivingly rotatable in a reverse direction, means drivingly connected to the motor shaft to drivingly rotate the first gear means, the last means including a gear having second teeth in driving relationship to the first gear teeth for drivingly rotating the first gear means, a rack having rack teeth engageable with the first gear teeth for rotating the first gear means when the motor is actuated to drive the shaft in the reverse direction, the rack being mounted for tangential and radial movement relative to the first gear teeth between a first position out of abutting relationship to the first gear means teeth, and a second position in driving engagement with the first gear teeth and rack operating means actuatable by the motor stalling when actuated to drive the shaft in the reverse direction for moving the rack from its first position to its second position and including moving the rack tangentially in a direction to rotate the first gear means in the same angular direction that the first gear means is driven when the motor shaft is driven in the reverse direction.

2. The apparatus of claim 1 further characterized in that the rack is movable between a tangential retracted position and a tangential advance position, that the rack operating means includes first power operated means for moving the rack between a datum radial outward position and a radial inward position such that the rack teeth are at least in engageable relationship with the first gear teeth as the rack is moved between it tangential retracted position and its tangential advance position, and second power operated means for moving the rack between its radial outward and radial inward positions.

3. The apparatus of claim 2 further characterized in that the first power means includes a rack housing for moving the rack therewith in opposite radial directions and mounting the rack for movement in opposite tangential directions relative thereto.

4. The apparatus of claim 2 further characterized in that the first power means includes first hydraulic ram means for moving the rack from one of the rack radial positions to the other radial position and that the second power means includes second ram means for moving the rack from one of the rack tangential positions to the other tangential position.

5. The apparatus of claim 4 further characterized in that the motor is a hydraulic motor, that each ram means is operable under fluid pressure, and that the rack operating means includes control means having a hydraulic line for applying fluid under pressure to the motor and means operable by pressurized fluid in the hydraulic line for applying fluid under pressure to the first ram means for moving the rack to the rack inward position and to the second ram means for moving the rack to the rack advance position.

6. The apparatus of claim 5 further characterized in that the means operable under pressure includes means for applying fluid under pressure first to the first ram means to move the rack radially inwardly and, after the rack has moved adjacent to the rack inward position, for applying fluid under pressure to the second ram means for moving the rack tangential to rotate the first gear means.

7. The apparatus of claim 5 further characterized in that the first power means includes resilient means for moving the rack radially outward from the rack radial inward position and that the second power means includes resilient means for moving the rack from the rack advance position to the rack second position.

8. The apparatus of claim 7 further characterized in that the control means includes valve means movable for applying fluid under pressure to the hydraulic line and alternately for exhausting fluid that is under pressure in the hydraulic line from the hydraulic line.

9. Apparatus for making up and breaking out a rod joint, comprising a housing having an interior, a driven member rotatably extending into the housing interior, gear means mounted in the housing in driving relationship to the driven member, first power operated means in driving relationship to the gear means for drivingly rotating the gear means to drivingly rotate the driven member in a reverse direction, the gear means having gear teeth, a rack mounted in the housing for both tangential and radial movement relative to the gear teeth between radial outer, tangential retracted positions out of driving intermeshing relationship relative to the gear teeth and radial inward, tangential advance positions such that as the rack is moved, the rack engages and applies a drive force to the gear teeth to rotate the gear means in a direction to therethrough rotate the driven member in a reverse direction, the rack having rack teeth for intermeshingly drivingly engaging the gear teeth, and second power operated means mounted by the housing for moving the rack from the rack radial outward, tangential retracted position to the rack radial inward, tangential advance positions in the event the first power means has insufficient power to initially start the breakout of the rod joint.

10. The apparatus of claim 9 further characterized in that there is provide control means selectively operable to a first condition for operating the first power operated means to, through the gear means, drive the driven member in a forward angular direction and alternately to a second condition to, through the gear means, drive the driven member in the reverse direction and that the second power operated means includes automatically actuated means for first moving the rack radially inwardly only in the event the first means fails to start rotation of the driven member through the gear means when the control means is operated to its second position and after the rack has been moved adjacent to the rack inward position, actuate the rack to move tangentially toward the rack advance position to rotate the gear means.

11. The apparatus of claim 10 further characterized in that the second power means includes means for automatically returning the rack to the rack radial outer, tangential retracted positions when in the rack radial inward, tangential advance positions after the control means is operated from its second position.

12. The apparatus of claim 9 further characterized in that the second power operated means includes a rack mount for mounting the rack for tangential movement relative thereto and radial movement therewith and third power operated means for radially moving the rack mount to thereby radially move the rack.

13. The apparatus of claim 12 further characterized in that the second power operated means includes fourth power operated means mounted to the housing for tangentially moving the rack relative to the rack mount.

14. The apparatus of claim 13 further characterized in that each of the first, third and fourth power operated means is operable under hydraulic pressure and that there is provided a hydraulic line for applying hydraulic fluid under pressure to the first power operated means to operate the first power operated means for rotating the gear means to drive the driven member in the reverse direction, and that the automatically actuated means includes control means such that in the event the first power means has insufficient power to start the rotation of the driven member in the reverse direction, fluid under pressure at the second power operable means increases above a preselected pressure to start the movement of the rack mount radially inwardly and, after the rack teeth and at least one of which engages the gear teeth and being engagable with the gear teeth upon the rack being moved tangentially, engage the gear teeth, to apply fluid under sufficient pressure to move the rack in a tangential direction toward the rack advance position to start the rotation of the gear means.

15. The apparatus of claim 14 further characterized in that the second power operated means includes spring means for constantly resiliently urging the rack to the rack retracted position and the rack mount to the rack outward position and that the driven member includes a chuck for clampingly engaging and rotating a rod to breakout a rod joint.

16. Apparatus for breaking out a threaded connection, comprising a housing having an interior, a driven member rotatably extending into the housing interior, gear means mounted in the housing in driving relationship to the driven member, first hydraulic power operable means operated under hydraulic pressure and in driving relationship to the gear means for drivingly rotating the gear means to drivingly rotate the driven member in a reverse direction to breakout a threaded connection, the gear means having gear teeth, a rack mounted in the housing for both tangential and radial movement relative to the gear teeth between radial outer, tangential retracted positions out of driving intermeshing relationship relative to the gear teeth and radial inward, tangential advance positions that as the rack is moved, the rack engages and applies a drive force to the gear means teeth to rotate the gear means in a direction to therethrough rotate the driven member, the rack having rack teeth for intermeshingly drivingly engaging the gear means teeth, a hydraulic line fluidly connected to the first hydraulic means for applying fluid under pressure to the first hydraulic means for operating the first hydraulic means, and second and third hydraulic operated means mounted by the housing and fluidly connected to the hydraulic line for respectively moving the rack radially inward and the rack toward the tangential advance position when the pressure in the hydraulic line exceeds a preselected pressure level.

17. The apparatus of claim 16 further characterized in that the second hydraulic means includes a first ram and that the third means includes a second ram.

18. The apparatus of claim 17 further characterized in that the second hydraulic means includes a rack mount having a rack mount tangential slot for the rack teeth to extend radially therethrough and first resilient means for constantly resilient urging the rack mount toward the rack radial outer position and moving the rack mount to the rack radial outer position after the termination of application of fluid under pressure to the hydraulic line, and that the third hydraulic means includes resilient means mounted by the housing for constantly resiliently urging the rack to the rack tangential retracted positions and moving the rack to the rack tangential retracted positions after the termination of the application fluid under pressure to the hydraulic line.

* * * * *